(12) United States Patent
Park et al.

(10) Patent No.: US 7,955,748 B2
(45) Date of Patent: Jun. 7, 2011

(54) CELL OR STACK FOR EVALUATING PERFORMANCE OF FUEL CELL AND METHOD OF EVALUATING PERFORMANCE OF FUEL CELL USING THE SAME

(75) Inventors: Gu-Gon Park, Daejeon (KR); Jin-Soo Park, Daejeon (KR); Min-Jin Kim, Daejeon (KR); Young-Jun Sohn, Daejeon (KR); Seok-Hee Park, Daejeon (KR); Sung-Dae Yim, Daejeon (KR); Tae-Hyun Yang, Daejeon (KR); Young-Gi Yoon, Daejeon (KR); Won-Yong Lee, Daejeon (KR); Chang-Soo Kim, Inchoen (KR)

(73) Assignee: Korea Institute of Energy Research, Daejeon (KR)

( * ) Notice: Subject to any disclaimer, the term of this patent is extended or adjusted under 35 U.S.C. 154(b) by 787 days.

(21) Appl. No.: 11/822,624

(22) Filed: Jul. 9, 2007

(65) Prior Publication Data
US 2008/0252299 A1    Oct. 16, 2008

(30) Foreign Application Priority Data

Jul. 12, 2006    (KR) .................... 10-2006-0065331

(51) Int. Cl.
*H01M 8/04* (2006.01)

(52) U.S. Cl. ........................................ 429/442; 429/517
(58) Field of Classification Search .................... 429/13, 429/24, 26, 34, 38, 442, 517
See application file for complete search history.

(56) References Cited

U.S. PATENT DOCUMENTS

| | | | | |
|---|---|---|---|---|
| 5,871,859 A | * | 2/1999 | Parise | 429/26 X |
| 6,544,680 B1 | * | 4/2003 | Takano et al. | 429/34 |
| 6,890,677 B2 | * | 5/2005 | Klitsner et al. | 429/34 |
| 6,972,161 B2 | * | 12/2005 | Beatty et al. | 429/38 |
| 7,045,244 B2 | * | 5/2006 | Champion et al. | 429/34 |
| 2006/0216559 A1 | * | 9/2006 | Olivier et al. | 429/26 |

* cited by examiner

*Primary Examiner* — Stephen J. Kalafut
(74) *Attorney, Agent, or Firm* — Arent Fox LLP

(57) ABSTRACT

The present invention provides a cell or stack for evaluating the performance of a fuel cell and a method of evaluating the performance of the fuel cell using the cell or stack, in which a semiconductor thermoelectric device, attached to the side surface of the unit cell or stack of the fuel cell, is provided maintain the cell or stack at a uniform temperature. The temperatures of an anode and a cathode of the fuel cell can be precisely changed or maintained such that the performance of the fuel cell can also be measured in sub-zero temperature conditions without requiring a separate environmental chamber. A rate of temperature decrease, at which the temperature decreases to a certain sub-zero temperature, or a rate of temperature increase can be precisely controlled.

3 Claims, 6 Drawing Sheets

Prior Art

Prior Art

CELL OR STACK FOR EVALUATING PERFORMANCE OF FUEL CELL AND METHOD OF EVALUATING PERFORMANCE OF FUEL CELL USING THE SAME

BACKGROUND OF THE INVENTION

1. Field of the Invention

The present invention relates, in general, to an apparatus for evaluating the performance of a fuel cell which generates electricity using an electrochemical reaction between externally supplied fuel and air, and, more particularly, to a cell or stack for evaluating the performance of a fuel cell and a method of evaluating the performance of a fuel cell using the cell or stack, which are suitable for evaluating the performance of a fuel cell in an environment in which a uniform temperature is maintained.

2. Description of the Related Art

Generally, technology for a fuel cell, which is a device for directly converting the energy of fuel into electrical energy, is well known. This fuel cell is typically implemented such that an anode and a cathod are attached to both sides of a polymer electrolyte membrane, and is operated such that the electrochemical oxidation of hydrogen, which is fuel, occurs on the anode (oxidation electrode or fuel electrode), and the electrochemical reduction of oxygen, which is an oxidizer, occurs on the cathode (reduction electrode or air electrode). By these reactions, the transportation of electrons from anode to cathode side occurs and generates the electricity.

FIG. 1 is a diagram schematically showing a conventional fuel cell in which a temperature control device using a heater is installed.

As shown in FIG. 1, a fuel cell system 1 includes a solid polymer-type stack 10 for generating electricity, a reformer 11 for producing hydrogen gas to be supplied to the stack 10, an air line 12 for supplying air to the stack 10, a battery 13 for charging or discharging the electricity generated in the stack 10, a temperature detection means for detecting the temperature of the stack 10, a heating means for applying heat to the stack 10 when the temperature detected by the temperature detection means is below a specified value, a control unit 14 for controlling various types of valves and driving operation, and a discharge line (not shown) for discharging $H_2O$ generated in the stack 10.

The stack 10 can be implemented in the form of a single unit cell in which an electrochemical reaction occurs, or a structure in which unit cells are sequentially stacked and fastened to each other. The structure of a unit cell is described with reference to FIG. 2. The unit cell includes a Membrane-Electrode Assembly (MEA) 24, in which gas diffusion layers of an anode 22 and a cathode side 23 for diffusing gas are joined to both sides of an electrolytic membrane 21, and separators 25, which have flow paths for the fuel gas and oxygen-containing gas in the anode 22 and the cathode 23, assembled to come into close contact with both sides of the MEA 24, and current collectors 26 and 27 disposed on both sides of the separators 25 to collect current for the anode 22 and the cathode 23.

The electrolytic membrane 21 of the MEA 24 is an ion-exchangeable polymer membrane. A representative electrolytic membrane 21, which is commercialized, includes a Nafion membrane from DuPont. The electrolytic membrane 21 functions to interrupt the cross-over of oxygen and hydrogen while functioning as a hydrogen ion transporter. The anode 22 and the cathode 23 catalysts which consist of Platinum(Pt) and carbons for the active site and supporting materials respectively, are each constructed so that porous carbon paper or carbon cloth is joined to both sides of the electrolytic membrane 21.

Each of the separators 25 is made of a compact carbon plate and has a number of ribs formed thereon, thus forming fuel gas flow path grooves 31 along the surface of the anode 22 and forming oxygen-containing gas flow path grooves 32 along the surface of the cathode 23 when the separators are assembled.

On the stack 10, a temperature detection sensor 40 is installed as a temperature detection means for detecting the temperature inside the stack 10, and a heater 50 is installed as a heating means for heating the stack 10 when the measured value detected by the temperature detection sensor 40 is below a lower limit of a specified range.

However, basically, the reaction of the fuel cell is a exothermic reaction, so that, when only a heater is provided, it is difficult to maintain a desired temperature. In practice, when the fuel cell is operated within a range of high current, a temperature difference occurs even between the anode and the cathode side.

Further, in the case of heating using a cartridge-type heater, it is impossible to heat uniformly over the entire cell area, and thus temperature differences occur in some portions.

When a humidifier and a pipe between the humidifier and the cell are heated in order to operate the cell, especially in high relative humidity, a gas containing high-temperature vapor directly flows into the cell, and thus the temperature of the cell can be increased.

In addition, since the saturated vapor pressure of water rapidly changes around a temperature of about 60° C., the small temperature differences in the cell in this condition greatly influence the performance of the fuel cell. Therefore, there is a limitation on obtaining precise data about the performance characteristics of the fuel cell.

Moreover, a conventional apparatus for evaluating the performance of a fuel cell cannot evaluate the operation characteristics in sub-zero temperatures, which has recently been an important issue in the fuel cell field. In order to evaluate the operation characteristics in sub-zero temperatures, a large-sized and expensive environmental chamber has typically been used.

SUMMARY OF THE INVENTION

Accordingly, the present invention has been made keeping in mind the above problems occurring in the prior art, and an object of the present invention is to provide a cell or stack for evaluating the performance of a fuel cell, which can simultaneously perform heating and cooling, can always precisely maintain the cell at a desired temperature even if gas and vapor are supplied from the stage preceding the cell of the fuel cell under any temperature conditions, and can keep the temperature uniform over the entire area of the cell or stack.

In order to accomplish the above object, the present invention provides a unit cell or stack for evaluating performance of a fuel cell, comprising a unit cell of the fuel cell or stack of unit cells, and at least one semiconductor thermoelectric device attached to a side surface of the unit cell or the stack.

Preferably, the evaluation cell is implemented so that semiconductor thermoelectric devices are attached to both sides of the unit cell, the unit cell comprising a membrane-electrode assembly composed of an anode, an electrolytic layer and a cathode, a separator, and the current collector.

Preferably, the semiconductor thermoelectric device may come into direct contact with the current collector.

Preferably, the semiconductor thermoelectric device may be formed in a shape of a plate, and covers most of an active area of the unit cell or stack, thus controlling temperature uniformly over the entire area of the unit cell or stack.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
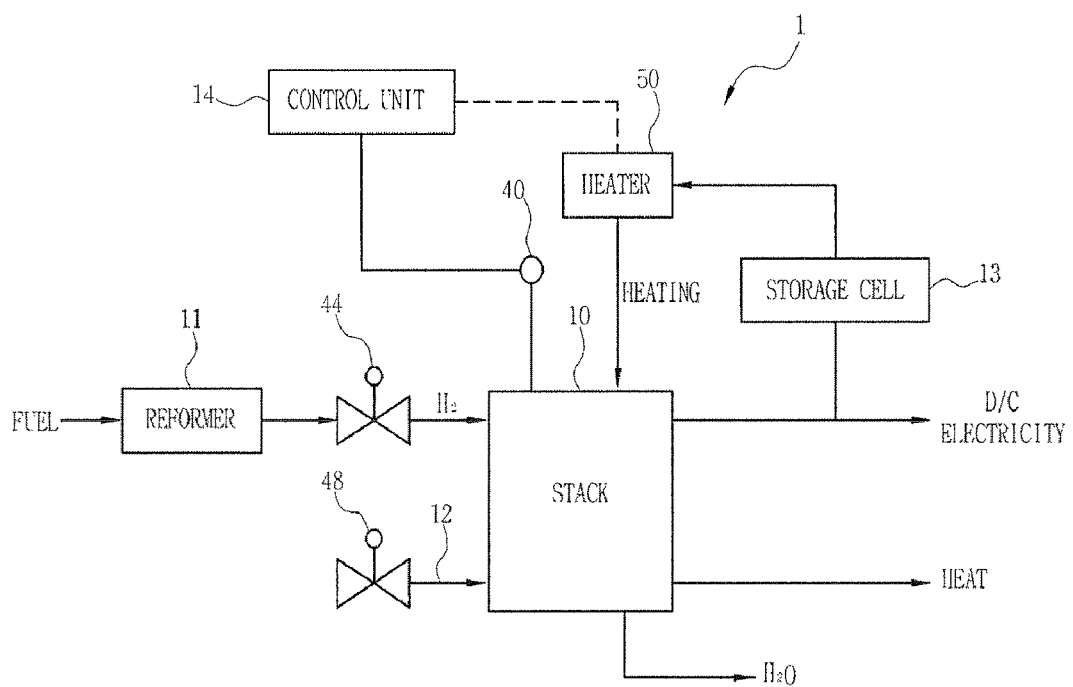
FIG. 1 is a diagram schematically showing the construction of a conventional fuel cell system having a temperature control device installed therein.
Figure 2:
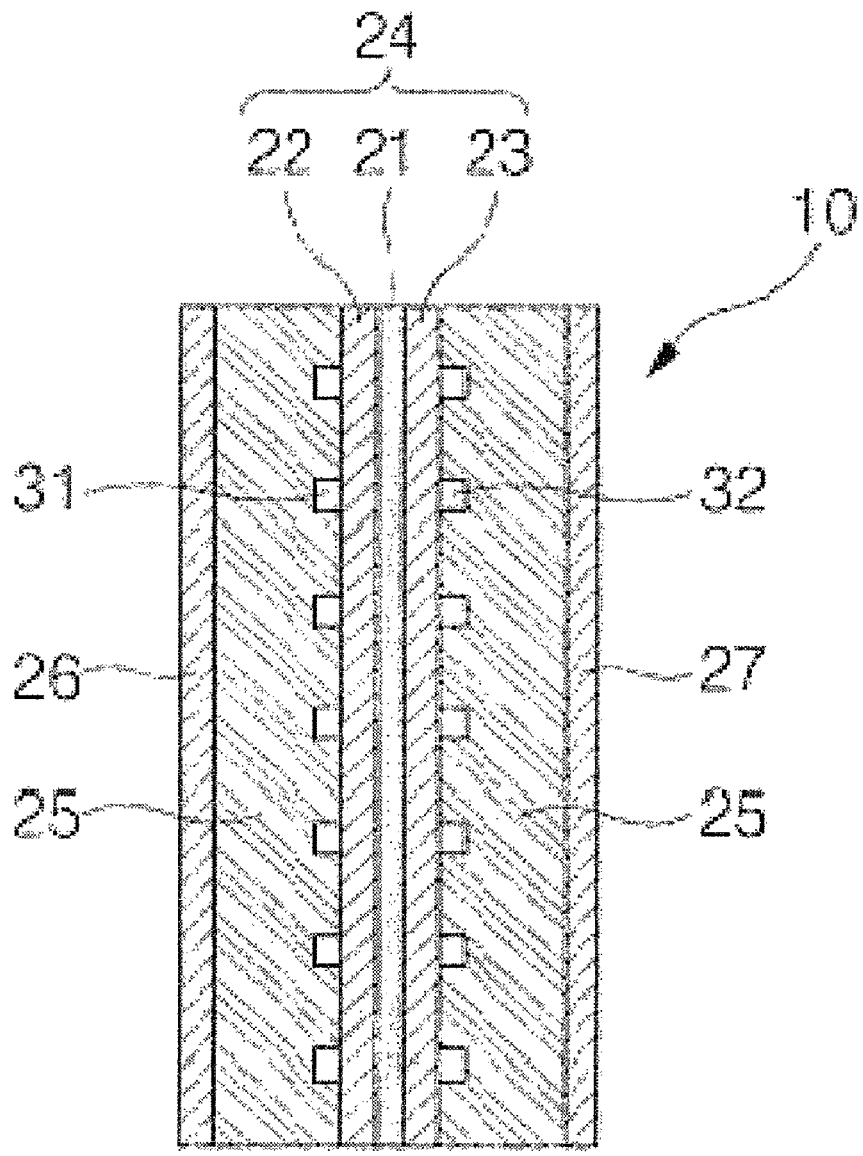
FIG. 2 is a schematic diagram showing the structure of a unit cell.
Figure 3:
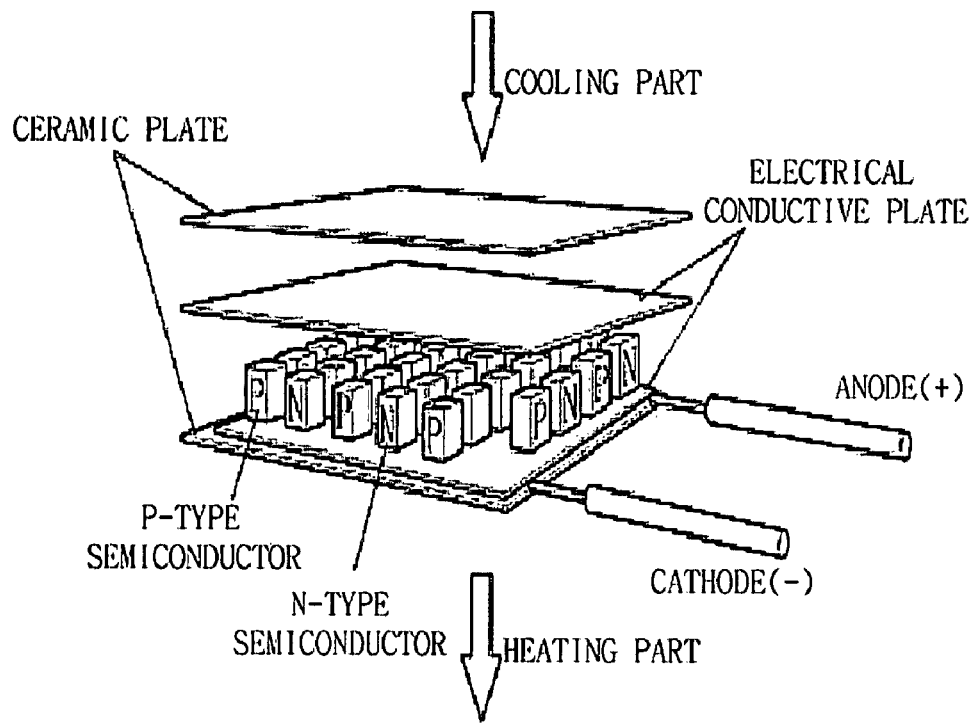
FIG. 3 is a schematic diagram showing a semiconductor thermoelectric device module.

The semiconductor thermoelectric device used in the present invention enables heating and cooling, and a schematic module thereof is shown in FIG. 3. When heat is moved from a high temperature side to a low temperature side due to the temperature difference of the module, electrons and holes (called carriers) are moved from the high temperature side to the low temperature side in an n-type thermoelectric element and a p-type thermoelectric element, respectively, and thus electricity is generated. Meanwhile, when current is made to flow through a thermoelectric heating and cooling module, cooling occurs on one surface of the module and heating occurs on the other surface thereof, thus enabling cooling and heating.

Figure 4:
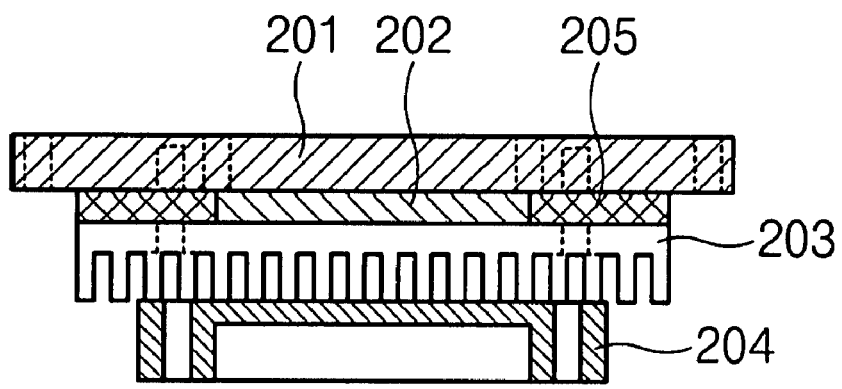
FIG. 4 is a sectional view showing a semiconductor thermoelectric device.

FIG. 4 is a view showing the section of a semiconductor thermoelectric device 200 used in the present invention. The semiconductor thermoelectric device 200 includes a thermal conductive plate 201, which functions as a thermal conductor when cooling or heating occurs, a semiconductor thermoelectric element 202, a heat exchanging unit 203 for discharging generated heat, a cooling fan (mounted on fan base 204), and a lagging and insulating material 205.

The semiconductor thermoelectric device can be made of a material such as Bi, Te, Se, Pb and Ge, or an alloy of two, three or four kinds of material selected from the group consisting of the above material. Further, the semiconductor thermoelectric device uses transformed DC power in order to heat or cool the thermoelectric element.

In order to diminish heat generated by the semiconductor thermoelectric device, air cooling or liquid cooling can be conducted. When the temperature of the thermoelectric element cannot be sufficiently decreased using only air cooling based on the cooling fan, cooling can be performed using a separate external coolant having a thermal capacity greater than that of air. When such a dual heat exchange method is used, cooling down to a temperature of −80° C. is possible. Meanwhile, since the thermoelectric device is provided with the water jacket or the like, it can adopt its own liquid cooling.

Temperature control using the apparatus for evaluating the performance of the fuel cell according to the present invention enables a test operation on the fuel cell down to −30° C. for a basic type, and down to a −80° C. for a dual heat exchange type. Further, the present invention can also evaluate the performance of the fuel cell around a temperature of 200° C. using the single apparatus.

Furthermore, temperature control using the semiconductor thermoelectric device in the present invention enables the adjustment of the rate of temperature increase or decrease.

The area of the surface of the unit cell or stack, to which the semiconductor thermoelectric device will be attached, may fall within a range from 4 $cm^2$ or 500 $cm^2$.

The cell or stack for evaluating the performance of the fuel cell according to the present invention can independently control the temperature (heating and cooling) of an anode and a cathode using separate thermoelectric devices respectively attached to the anode and the cathode. Therefore, when the fuel cell is operated in a range of high current, a temperature difference between the anode and the cathode can be prevented.

Hereinafter, a cell or stack for evaluating the performance of a fuel cell according to the present invention, having the above construction, is described in detail below with reference to the embodiments of the attached drawings.

Figure 5A:
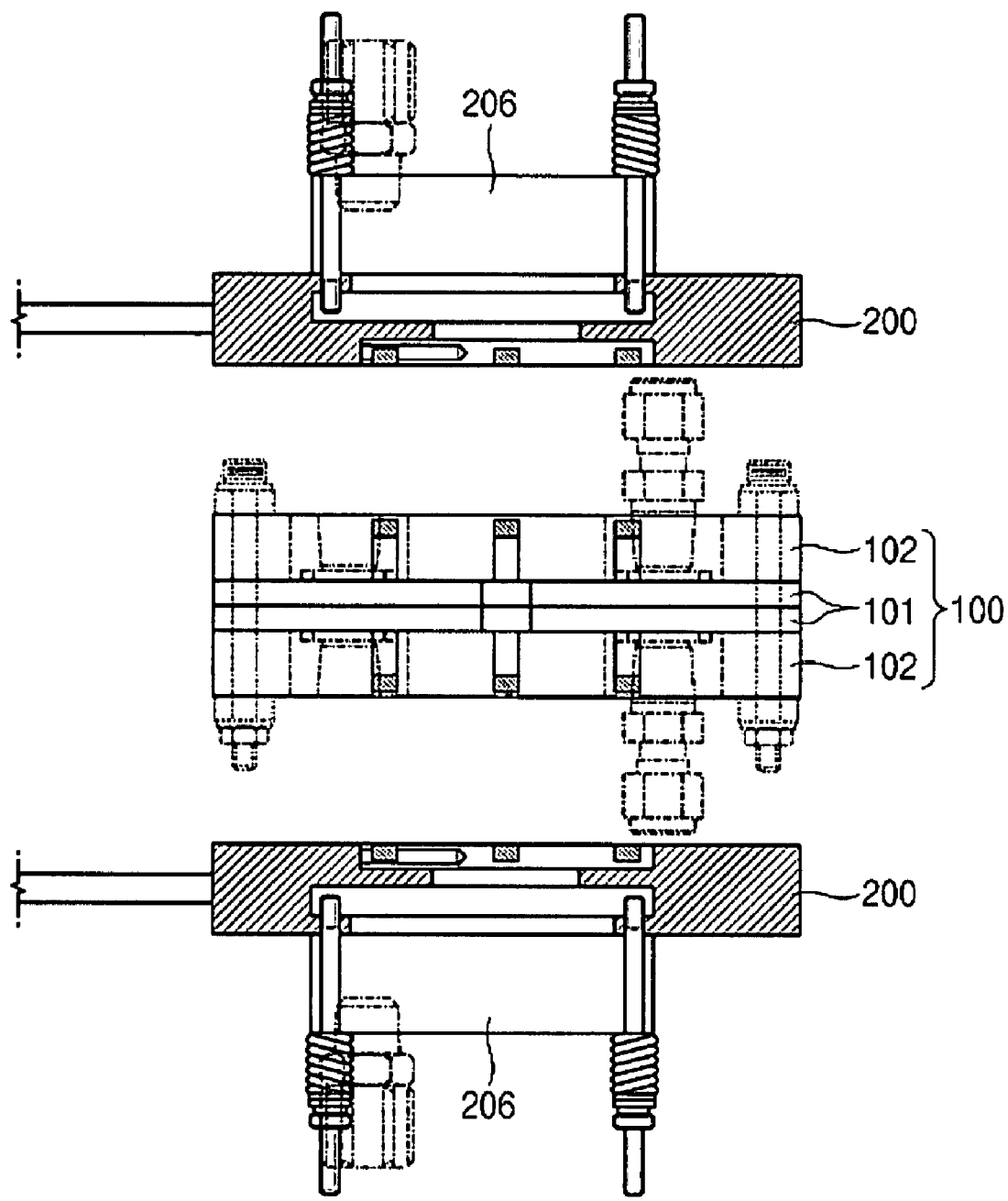
FIG. 5A is an exploded perspective view showing a evaluation cell before semiconductor thermoelectric devices are fastened to a cell.
Figure 5B:
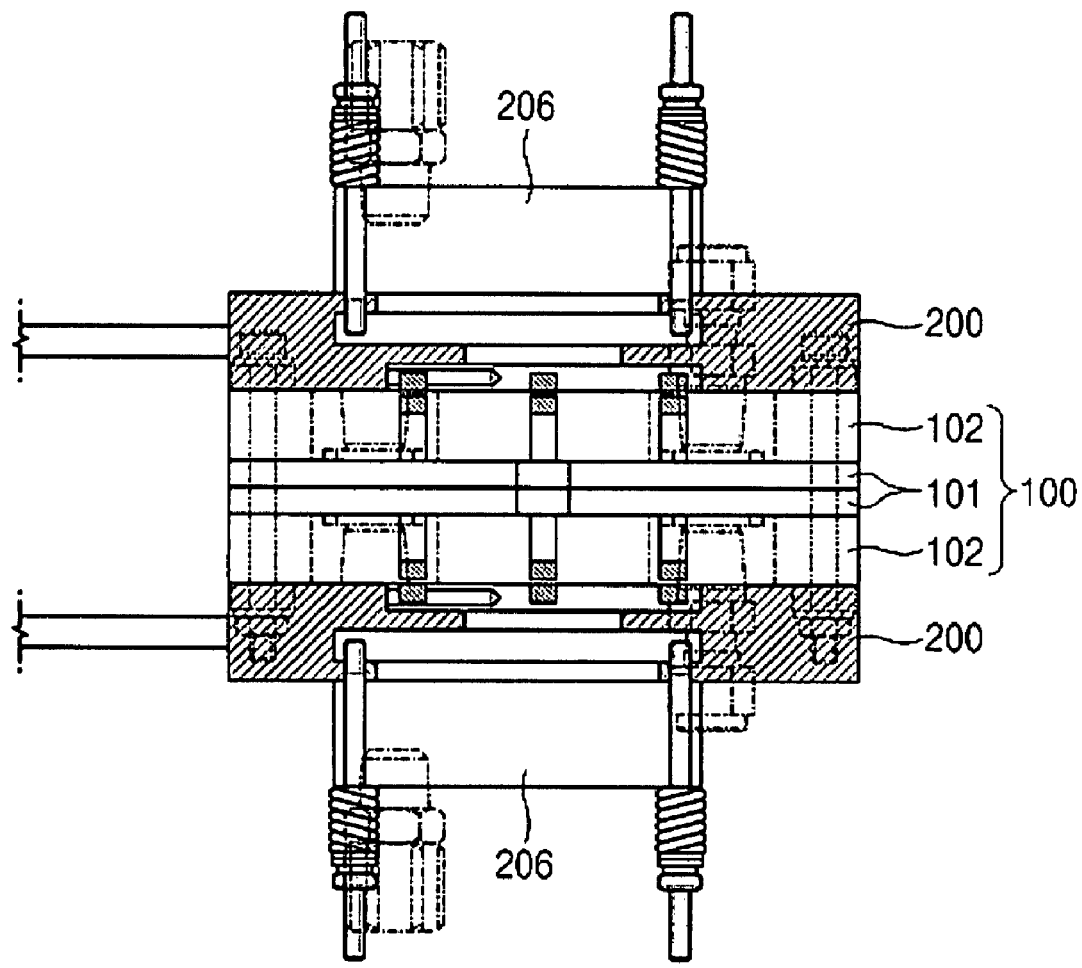
FIG. 5B is a perspective view showing the evaluation cell after the semiconductor thermoelectric devices are fastened to a cell.

FIGS. 5A and 5B illustrate an evaluation cell before and after semiconductor thermoelectric devices 200 are fastened to a unit cell 100.

In the unit cell 100, composed of a Membrane-Electrode Assembly (MEA) (not shown), separators 101, and current collectors 102, the current collectors 102 come into direct contact with the semiconductor thermoelectric devices.

Each of the current collectors 102 must be made of a material having excellent electric conductivity and excellent corrosion resistance and causing no hydrogen embrittlement. Preferably, one or more materials selected from among copper, Steel Use Stainless (SUS), Al and Ti can be used as the material. If necessary, the current collectors 102 can be coated with gold, silver, platinum or nickel and used.

Each of the separators 101 is preferably made of a material such as graphite, SUS or Ti.

Meanwhile, in order to fasten the semiconductor thermoelectric devices 200 to the unit cell 100, a bolt and a nut are used. However, the fastening means of the present invention is not limited to the bolt and nut, but any means capable of bringing the thermoelectric devices into close contact with the current collectors of the unit cell to thus transport heat through the interfaces between the thermoelectric devices and the current collectors can be used as the fastening means. For example, a magnet can be inserted into the thermal conductive plate 201, and another magnet can be inserted into the opposite side, so that contact can be maintained by the force of the magnets. In this case, the two contact surfaces must be very smooth.

Further, in order to diminish generated heat, each thermoelectric device 200 is provided with a water jacket 206 on the top thereof, and thus can be independently liquid cooled.

Figure 6:
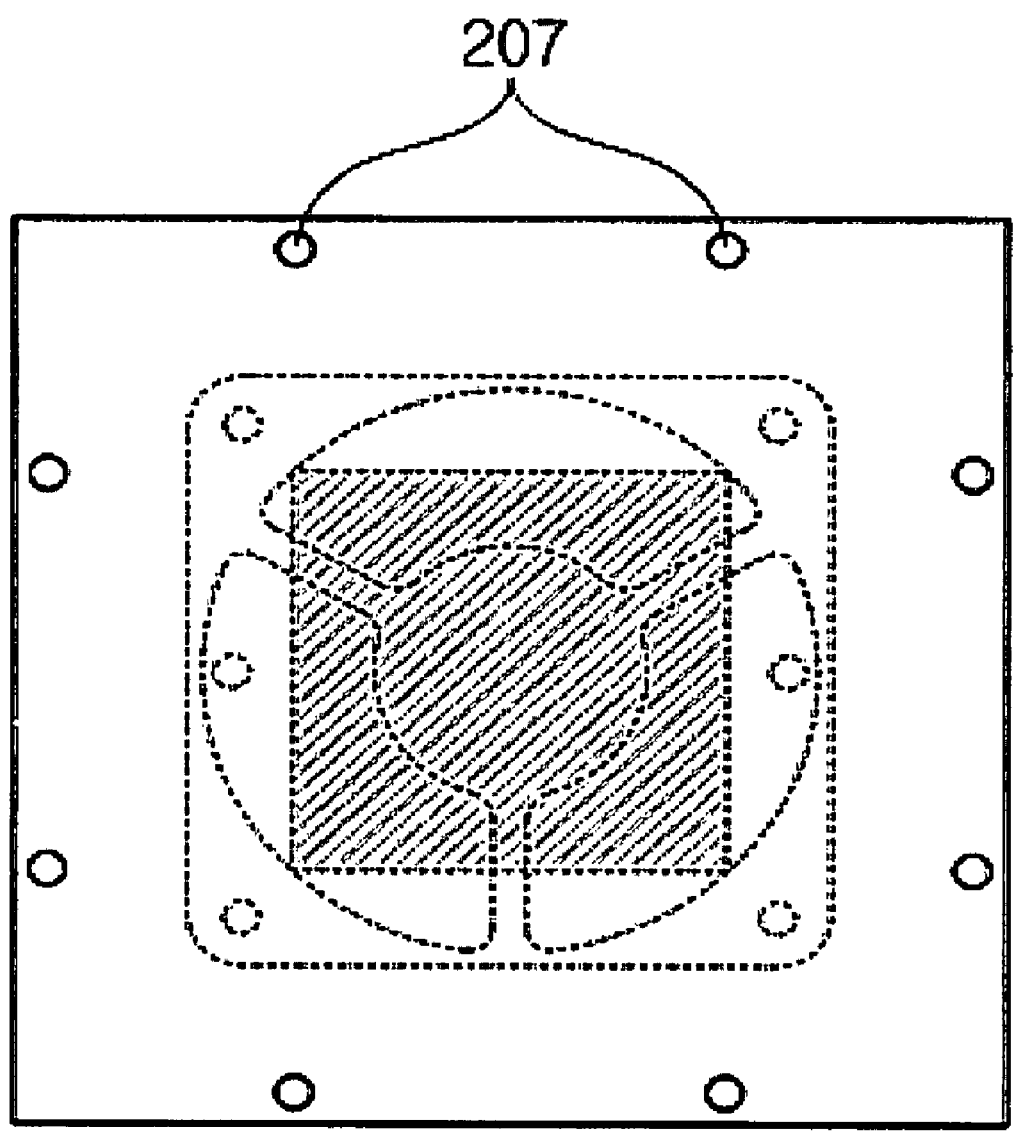
FIG. 6 is a front view of a semiconductor thermoelectric device.

FIG. 6 is a front view showing the thermoelectric device, wherein it can be seen that 8 screw holes are formed as fastening holes 207 so that the thermoelectric device can be attached to the side surface of a unit cell or stack. The thermoelectric device can be fastened to the unit cell using screws. On the contact surfaces thereof, a conductive binder or powder can be used to improve thermal conductivity. The number of fastening holes 207 can be suitably selected in such a way to sufficiently bring the thermoelectric device into close contact with the cell or stack and fix the thermoelectric device according to the cross section of the cell or stack.

As described above, the semiconductor thermoelectric device of the present invention comes into direct contact with most of the active area of a unit cell in the form of a plate, and thus temperature differences occurring in some portions of the cell can be minimized. The apparatus for evaluating the performance of the fuel cell according to the present invention can arbitrarily change or maintain the temperatures of an anode and a cathode as needed. Further, the performance of the fuel cell can be measured even in sub-zero temperature conditions without using a separate environmental chamber or the like, and a rate of temperature decrease, at which the temperature falls to a certain sub-zero temperature, or a rate of temperature increase can be precisely controlled.

Therefore, the present invention can be used to easily and precisely evaluate the performance of the fuel cell in an environmental temperature in which the operation of the fuel cell is required.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of evaluating performance of a fuel cell, the fuel cell including one or more unit cells, each unit cell comprising an anode, an electrolytic layer and a cathode, a separator and a current collector, comprising the steps of:
    attaching at least one semiconductor thermoelectric device to the current collector of a unit cell of the fuel cell, or a stack of unit cells, and
    independently controlling the temperatures of the anode and the cathode thereof.

2. The method according to claim 1, wherein the unit cell is implemented so that a rate of temperature increase or a rate of temperature decrease in the unit cell is controlled.

3. The method according to claim 1, wherein the unit cell or stack is operated within a temperature range from −80° C. to 200° C.

* * * * *